US012372055B2

(12) United States Patent
O'Hora

(10) Patent No.: US 12,372,055 B2
(45) Date of Patent: Jul. 29, 2025

(54) CLOSED LOOP HYDROPOWER GENERATOR

(71) Applicant: SynCells, Inc., Boston, MA (US)

(72) Inventor: Gerard O'Hora, Brighton, MA (US)

(73) Assignee: SynCells, Inc., Boston, MA (US)

( * ) Notice: Subject to any disclaimer, the term of this patent is extended or adjusted under 35 U.S.C. 154(b) by 0 days.

(21) Appl. No.: 18/339,500

(22) Filed: Jun. 22, 2023

(65) Prior Publication Data

US 2023/0417215 A1 Dec. 28, 2023

Related U.S. Application Data

(60) Provisional application No. 63/354,607, filed on Jun. 22, 2022.

(51) Int. Cl.
*F03B 17/00* (2006.01)

(52) U.S. Cl.
CPC ........ *F03B 17/005* (2013.01); *F05D 2220/76* (2013.01)

(58) Field of Classification Search
CPC ........................... F03B 17/005; F05D 2220/76
See application file for complete search history.

(56) References Cited

U.S. PATENT DOCUMENTS

| | | | |
|---|---|---|---|
| 4,030,303 | A | 6/1977 | Kraus et al. |
| 2019/0372449 | A1 | 12/2019 | Mills |
| 2020/0309085 | A1 | 10/2020 | Maynard |

FOREIGN PATENT DOCUMENTS

| | | | | |
|---|---|---|---|---|
| CN | 208356310 U | 1/2019 | | |
| CN | 213116695 U | 5/2021 | | |
| EP | 2549095 A1 * | 1/2013 | ............ | F03B 17/005 |
| GB | 2459510 A * | 10/2009 | ............ | F03B 17/005 |
| JP | 11153082 A | 6/1999 | | |

OTHER PUBLICATIONS

PCT/US2023/025992, "International Search Report and the Written Opinion", Sep. 21, 2023, 10 pages.

* cited by examiner

*Primary Examiner* — Viet P Nguyen
(74) *Attorney, Agent, or Firm* — Kilpatrick Townsend & Stockton LLP

(57) ABSTRACT

In an embodiment, a closed loop electrical generator may include a multiphase riser column. The generator may also include a liquid return column. The generator may include a turbine generator disposed between the multiphase riser column and the liquid return column, such that a working fluid flows from the liquid return column to the turbine generator and then to the multiphase riser column. The generator may include a gas return column. The generator may include a compressor fluidly connected to the gas return column and the multiphase riser column, such that a gas from the gas return column is provided to the multiphase riser column and combined with the working fluid to produce a multiphase fluid. The generator may also include a separator fluidly connected to the multiphase riser column, the liquid return column, and the gas return column.

19 Claims, 7 Drawing Sheets

CLOSED LOOP HYDROPOWER GENERATOR

CROSS-REFERENCE TO RELATED APPLICATION

This application claims the benefit of U.S. Provisional No. 63/354,607 filed on Jun. 22, 2022, entitled "VACUUM-ASSISTED AND GRAVITY-DRIVEN ELECTRICAL GENERATOR," the entire contents of which are incorporated herein by reference.

TECHNICAL FIELD

This disclosure describes a system using the principles of fluid motion, gravity, pressurized fluids, hydrostatic pressure, and to a lessor extend, gas entrainment, polytropic expansion, and others.

BACKGROUND

Hydro power has been used for many years as a natural source of clean, dependable electricity, and energy storage when the system can support. However, the environmental toll and use of land are proving untenable. The basic operating principle for hydropower is flow of water due to gravity, with power capacity directly related to water head height and flow volume. Similarly, gas-powered (e.g., air-powered) water generators use mechanical air compressors to inject air into a system, entraining this air into a fluid, and thereby creating a mass imbalance that causes a flow of water between two vertical towers, or to pump fluid in the case of an air-lift pump.

SUMMARY

In an embodiment, a closed loop electrical generation system may include a closed-loop gas structure that provides nitrogen and may include a gas return column and a shared multiphase riser column. The system may also include a closed-loop liquid structure that provides a working fluid and a liquid return column and the shared multiphase riser column. The system may include a separator with a multiphase inlet pipe fluidly connected to the shared multiphase riser column, a gas outlet pipe fluidly connected to the gas return column, and a working fluid outlet pipe fluidly connected to the liquid return column. The separator may be disposed a top of the shared multiphase fluid riser column. The system may include a compressor disposed at a bottom of the closed-loop gas structure and configured to pressurize the nitrogen and provide the pressurized nitrogen to the shared multiphase riser column to entrain the pressurized nitrogen in the working fluid. The system may include a vacuum pump and a turbine generator disposed at a bottom of the closed-loop liquid structure such that the working fluid causes one or more blades of the turbine generator to turn and produce electricity.

In some embodiments, the compressor may include at least one of a heat exchanger and an intercooler. The working fluid may include water and one or more of tungsten, barite, $CaBr2$, $MnO4$, $Ca(NO3)2$, KI, and polymethyl siloxane silicone. The working fluid may include fluorocarbons. In some embodiments, a plurality of closed-loop gas structures and the plurality of closed-loop liquid structures may share one or more shared multiphase riser columns. The pressurized nitrogen may be provided to the shared multiphase riser column within a range of 100 to 1000 psi, inclusive. An operating pressure of the closed loop electrical generation system may be above atmospheric pressure.

In an embodiment, a closed loop electrical generator may include a multiphase riser column. The generator may also include a liquid return column. The generator may include a turbine generator disposed between the multiphase riser column and the liquid return column, such that a working fluid flows from the liquid return column to the turbine generator and then to the multiphase riser column. The generator may include a gas return column. The generator may include a compressor fluidly connected to the gas return column and the multiphase riser column, such that a gas from the gas return column is provided to the multiphase riser column and combined with the working fluid to produce a multiphase fluid. The generator may also include a separator fluidly connected to the multiphase riser column, the liquid return column, and the gas return column.

In some embodiments, the separator may include a mist filter and a separation tank, configured such that the gas and the working fluid are separated from the multiphase fluid. The compressor may include a first compressor, an intercooler, a second compressor, an absorption chiller, and a heat exchanger. Heat produced by the compressor may be provided to the multiphase fluid within the multiphase riser column. The gas may include at least one of nitrogen, hydrogen, and argon. The working fluid may include water and at least one of $Mn2O2$, $CaBr2$, bentonite, and polyacrylamide. The multiphase riser column and the liquid return column may form a closed-loop containing the working fluid. The multiphase riser column and the liquid return column may form a closed loop containing the gas.

In an embodiment a method of producing electricity may include providing a working fluid to a multiphase riser column. The method may include providing, by a compressor, a gas to the multiphase riser column, such that the working fluid and the gas combine to form a multiphase fluid. The method may include separating, in a separator, the gas and the working fluid from the multiphase fluid. The method may include providing the gas from the separator to the compressor via a gas return column. The method may include providing the working fluid from the separator to a turbine generator via a liquid return column such that the working fluid causes the turbine generator to produce electricity.

In some embodiments, the multiphase fluid may flow upwards in the multiphase riser column to the separator. Heat may be provided to the multiphase riser column to increase a temperature of the multiphase fluid within the multiphase riser. The working fluid may accelerate from the separator to the turbine generator at least in part due to gravity. The gas may include nitrogen.

DETAILED DESCRIPTION

Figure 1:
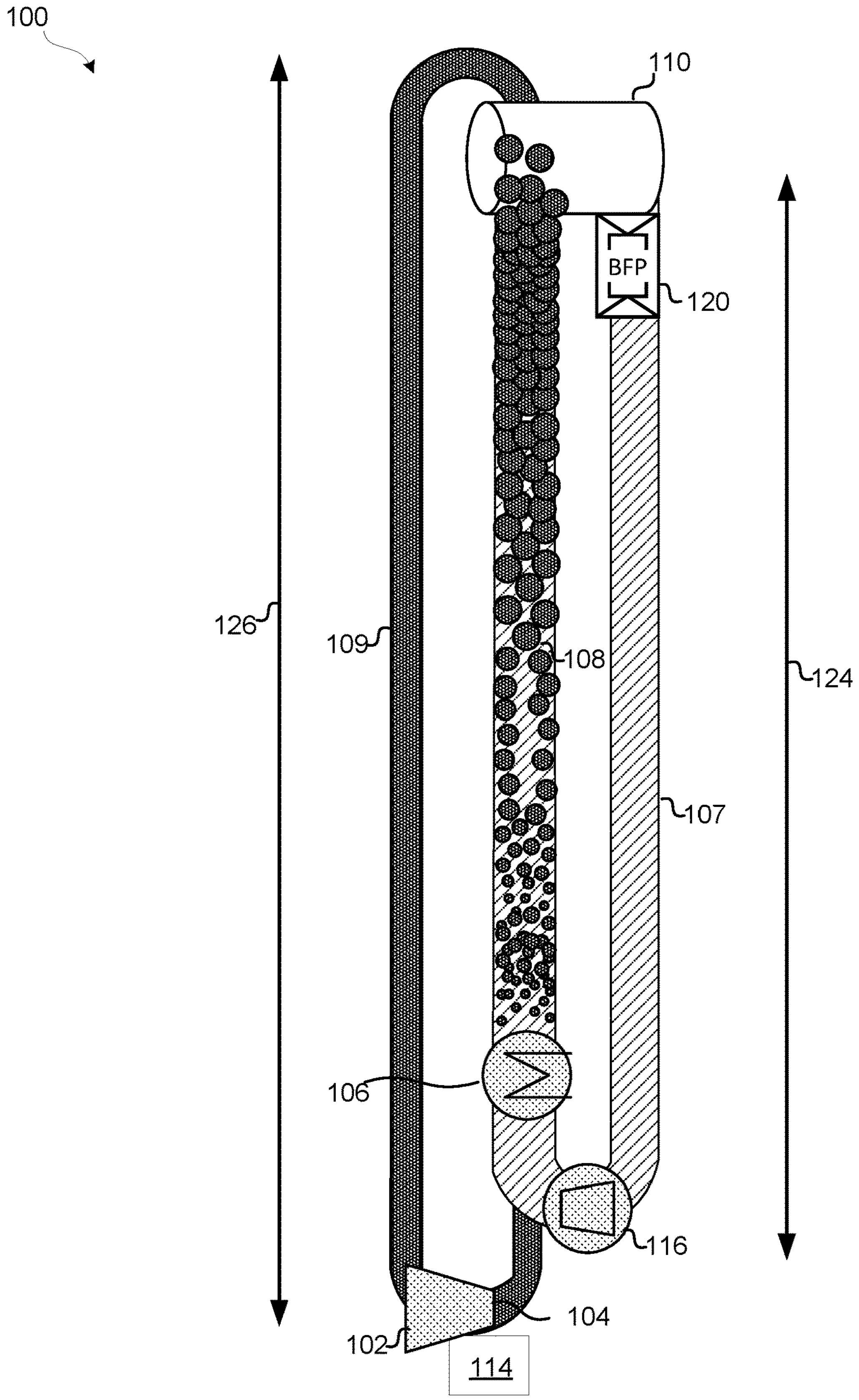
FIG. 1 illustrates an example of an energy-generation system, according to certain embodiments.

Hydropower utilizes work done by gravity on water to turn turbines in order to produce electricity. Typically, the water is held in a reservoir and guided down to the turbines via one or more pipes called penstock in a dam or other such structure, allowing gravity to accelerate the water and perform work on the turbines. While generally considered a reliable source of energy, hydropower is not without its faults. There may be ecological costs associated with damming rivers and other waterways to produce electricity. Also, once water is released into the dam to generate electricity (or for other reasons), there is generally no way to recover the released water. Instead, the water must be replenished by rainfall. If a water level of a reservoir falls below an intake on the dam due to drought or other natural or manmade conditions, no water can flow to the turbines. In other words, because this style of hydroelectric generation is not a closed-loop, changes in precipitation may render at least some hydroelectric sources unusable.

An alternative form of hydroelectric energy generation may be a closed-loop generator. A closed-loop generator is one in which little to no water leaves the system once it is filled. The water in the closed-loop generator may fall through a pipe or column to a turbine in order to generate electricity. The water must then be brought back up to a top of the closed-loop generator and then allowed to fall once more. An issue arises in that generally, pumping water to a height takes at least as much work as the water is able to perform when allowed to flow from that height. Pumps, for example, generally use as much of more electrical power to move water to a height than can be generated by the same mass of water falling from the height. This is why pumped storage hydro projects consume more energy than they generate as the work is not fully reversible due to efficiency losses. However, other physical phenomena may allow for the work to be done to lift water within the closed-loop system such that a net positive amount of electrical energy may be generated.

For example, a gas may be provided to the closed-loop generator via a compressor such that the gas becomes entrained within the water (or other "working fluid") and rises up a first column. The gas may then be separated from the working fluid at the top of the closed loop system, and the working fluid directed down a second column. In other words, the first column becomes a riser column filled with a multiphase fluid (gas and working fluid) and the second column becomes a return column that allows the working fluid to accelerate due to gravity and perform work on a turbine generator.

Several forces and/or phenomena may perform the work needed to bring the working fluid to the top of the closed-loop generator. One example may be a difference in mass, volume and density between the working fluid and the multiphase fluid. The multiphase fluid may include the gas entrained in the working fluid and be flowing in the riser column. The multiphase fluid may be less dense and/or less have less mass than the working fluid, flowing only in the return column. There may therefore be a pressure from the bottom of the return column to the bottom of the riser column based on the difference in density and mass.

Another example may be the drag force experienced by the working fluid component of the multiphase fluid due to the entrained gas component. The relevant drag equation may be given by:

$$F_d = -\frac{1}{2}A_p\rho_c C_D|u_p|U_p - 1/2V_p\rho_c\frac{dU_p}{dt}$$

where $A_p$ is the area of a particle (here a bubble of gas entrained in the working fluid); $\rho_c$ is the density of the working fluid, $C_D$ is the drag coefficient, $U_p$ is the velocity of the particle, and $V_p$ is the volume of the particle. While the compressor may take some electrical energy to provide the gas into the riser column, manipulating some of these variables (e.g., $A_p$, $\rho_c$, $U_p$, and $V_p$) may lead to an increase in at least the drag force, and therefore reduce the amount of energy needed to lift the multiphase fluid up the riser column.

Some closed-loop systems currently utilize an open gas loop to provide the gas to the riser columns. Because the gas loop is open, the choice of gas is effectively limited to air as any gas supplied to the system is subsequently released. A closed gas loop may allow for other gases to be employed. Furthermore, an operating pressure within the system may be limited due to the open nature of the gas loop. By utilizing a closed loop, the operating pressure may be increased or decreased to affect the overall efficiency of the closed-loop generator.

The system design may incorporate one or more heat exchangers that allow external sources of heat, waste heat from industrial processes for example, or natural heat sources such as the ambient air or geothermal or artificially generated sources through solar PVs that heat an electrical coil. Further still, solar thermal concentrators may be used to externally heat water, the water vapor from which may be injected into the system. With water vapor being lighter than air, the water vapor may rise faster through the fluid. Since that gas may contain thermal energy, it may transfer energy to the fluid, thereby raising the temperature profile of the working fluid, decreasing the viscosity, and increasing net power output.

The system may employ vacuum pump(s) to decrease the pressure within the system, allowing the gas within the system to expand, thereby increasing the fluid mass displaced per unit of gas mass as it flows through the system. The system may also employ a heat pump before the top of the gas column to lower the temperature of vapor passing through it, causing it to condense quicker and stay in the tower rather than being drawn through a vacuum pump or compressor. The energy from that heat pump may be rejected into the tower base, either to the gas stream or directly to the working fluid, thereby adding more energy and work potential to the fluid.

FIG. 1 illustrates an example of an energy-generation system 100, according to certain embodiments. The system 100 may include a turbine 116, a vacuum pump 102, a separator 110, and a bias control valve 120. The system 100 may include a plurality of interconnected vertical pipes (sometimes "columns") arranged in one or more loops. A fluid loop may include a liquid return column 107 and a shared multiphase riser column 108. A gas loop may include a gas return column 109 and the shared multiphase riser column 108. The separator 110 may be disposed at a top portion of the shared multiphase riser column 108. The separator 110 may be fluidly connected to the liquid return column 107, the shared multiphase riser column 108, and the gas return column 109.

The separator may interconnect one or more columns, allowing fluid displaced during operation to be used to startup another column. This may reduce the net amount of fluid required to fill the system. Pumps and other means may be used to shift the fluid levels between columns for optimal startup and operating conditions, which also avoids excess weight at the top of the tower which impacts structural design and seismic considerations. Fluid separators prior to the compressor may be used to intercept overflow fluid descending the air return, which may be stored at ground level for future system startup, changes in fluid volume due to ambient temperature, and other factors.

The liquid return column 107 and the shared multiphase riser column 108 may be fluidly connected at a top portion and a bottom portion of each column. The liquid return column 107 may include a diameter within a range of 0.4 m to 0.5 m, inclusive. In some embodiments, the diameter may be greater (e.g., 1.5 m). The diameter may be selected based in part on an amount of work required by the system 100. The turbine 116 may be disposed at the bottom portion of the liquid return column 107 and the shared multiphase riser column 108, such that a fluid may enter the turbine 116 via the liquid return column 107 and exit the turbine 116 into the bottom portion of the shared multiphase riser column. The turbine 116 may be a turbine generator, that generates electricity when the turbine is turned. The liquid return column 107 may contain a working fluid to drive the turbine 116. The working fluid may include water and one or more other substances, such as barite, Car, permanganate ($MnO4$), Calcium Nitrate ($Ca(NO)2$), potassium iodide (KI), and polymethyl siloxane silicone (PDMS), and other suitable substances. The one or more substances may be used to adjust a viscosity, a density, drag, or other characteristics of the working fluid. Additionally or alternatively, the one or more substances may decrease corrosivity of the working fluid. One of ordinary skill in the art would recognize many different appropriate substances, alone and/or in combination. In some embodiments, the working fluid may include ethylene glycol and/or other liquids. In other embodiments, the working fluid may include fluorocarbons (e.g., 3M Novec) and/or other soluble and insoluble additives. The other additives may increase the density of the working fluid.

The gas return column 109 and the shared multiphase riser column 108 may be fluidly connected. The gas return column may contain a gas, such as air, nitrogen, argon, hydrogen, or other such gas. The gas loop 112 may include a vacuum pump 102 disposed at a bottom portion of the gas return column 109. The vacuum pump 102 may create a negative pressure in the gas return column 109, such that the gas is drawn from the top of the shared multiphase riser column 108 into the gas return column 109. The gas return column 109 may include a gas injector, configured to deliver the gas to the shared multiphase riser column 108. In some embodiments, the vacuum pump may be coupled with a compressor.

The liquid return column 107 and the shared multiphase riser column 108 may include a first height 124. The first height may be within a range of 30 m to 300 m, inclusive. The first height 124 and the diameter of the liquid return column 107 may be configured to enable a specific amount of work to be applied to the turbine 116. The gas return column 109 may include a second height 126, greater than the first height 124. The second height 126 may be determined based at least in part on the working liquid, the gas, an associated vapor pressurization of both, and/or the separator 110. For example, if the working fluid is water, the difference between the second height 126 and the first height 124 may be at least approximately 10 m for operation at standard temperatures, which may be the theoretical equivalent of creating 10 m of head pressure for the turbine 116. In other embodiments, with working fluids other than water, the difference between the first height 124 and the second height 126 may be smaller (e.g., 2 m).

In some embodiments, the system 100 may be integrated with an existing building (e.g., to provide power for the building). The first height 124 and the second height 126 may therefore be dependent on the height of the building. The system 100 may extend above and below the building to increase the first height 124 and the second height 126. An amount of energy generated by the system 100 may be at least partially dependent on the first and second heights 124 and 126.

At rest, the working fluid may occupy the same level in both the liquid return column 107 and the shared multiphase riser column 108, owing to the effect of gravity on the masses relative to the volume. The gas may be dispersed throughout the gas return column 109 and/or the shared multiphase riser column 108. Upon activation of the vacuum pump 102, the working fluid may experience lift pressure until the point that it exceeds the vapor pressure, causing the working fluid to vaporize. In some embodiments, an inlet valve 104 may be placed downstream from the vacuum pump 102 in the bottom portion of the gas return column 109, such that air or other gasses may be added to the system 100. The negative pressure may be used to draw gas into the bottom of the shared multiphase riser column 108 through the inlet valve 104, thereby entraining the gas in the working fluid within the shared multiphase riser column 108, creating a multiphase fluid. Because the multiphase fluid is composed of the gas and the working fluid, the mass of the multiphase fluid (and density thereof) may be less than that of the working fluid. A mass imbalance between multiphase fluid and the working fluid coupled with a portion the working fluid within the multiphase fluid being vaporized within the shared multiphase riser column 108, may initiate an upwards flow of the multiphase fluid in the shared multiphase riser column 108. In some embodiments, a booster pump (not shown) may assist in starting the flow of the working fluid.

At the top of the shared multiphase riser column 108, the multiphase fluid may enter the separator 110 through an inlet. The multiphase fluid may then separate into the gas and the working fluid. The gas may then flow through a gas outlet and into the gas return column 109. The gas outlet may be placed above an operating level of the separator 110, such that the working fluid does not reach the gas outlet. The separator 110 may include a mist filter that may remove particles of the working fluid from the gas. The gas may then flow down the gas return column 109, due in part to the negative pressure created by the vacuum pump 102.

The working fluid may then flow into the liquid return column via a liquid outlet. The liquid outlet may be placed below the operating level, such that the liquid outlet is submerged by the working fluid during operation. The working fluid may flow through the turbine 116, causing electricity to be generated. As the working fluid flows through the turbine 116, this may result in electricity being generated as a system output.

As discussed above in relation to the drag equation, one objective may be to increase a volume of the gas and/or a volume of bubbles of the gas in the multiphase fluid. Doing so may create pressure at the top of the liquid return column 107 and velocity in the working fluid.

In some embodiments a thermal energy injection site 106 may deliver thermal energy to the shared multiphase riser column to increase the volume of the gas within the multiphase fluid. The thermal energy injection site 106 may be implemented using a heat exchanger or other suitable method. The thermal energy injection site 106 may be positioned on the shared multiphase riser column 108. The thermal energy for the thermal energy injection site 106 may originate at least in part from the outflow of the vacuum pump 102 and/or a compressor. The thermal energy may be provided to the gas before being introduced to the shared multiphase riser column 108. In some embodiments, the thermal energy may be provided to the gas prior to a final vacuum pump or compressor in a series of vacuum pumps and/or compressors included in vacuum pump 102.

The vacuum pump 102 may feed into the bottom of the shared multiphase riser column 108 as a closed loop system, imparting any thermal energy generated in the process to the working fluid. Alternatively, or additionally, the intake at the inlet valve 104 may source gas or fluid from external heat sources to inject thermal energy into the working fluid. This thermal energy may increase the volume of gas, displacing more working fluid and thereby accelerating the flow rate of the working fluid while reducing the compression work. The negative pressure applied by the vacuum pump 102 may depend on the temperature and density of the working fluid. For example, water may boil at approximately 100° C. at standard pressure. However, if the negative pressure is approximately 744 Torr, then water may instead boil at approximately 18° C. At 50° C., the negative pressure may be approximately 667 Torr. As the negative pressure to reaches a point near vaporization of the working fluid, a larger bubble volume/area of the entrained gas may be formed in the multiphase fluid. Per the drag equation above, increasing the bubble volume may increase the force applied to the multiphase fluid, creating more efficient energy generation.

Additionally, raising the temperature of the working fluid may promote increases gas bubble size, displaces more working fluid in the riser, and therefore produce more electricity by increasing the flow of working fluid. The thermal energy may also raise the temperature of the working fluid, which may reduce the negative pressure required to boil the working fluid (or to remain just shy of that condition depending on optimal working conditions). These effects may combine to lower the parasitic energy required to maintain the system, thereby increasing the net energy generated. External heat sources may include industrial byproducts and waste heat from boilers, furnaces, processes, etc., along with heat rejected from heat pumps, compressors, etc., when the system may be collocated with such activities. Alternative sources of thermal energy, such as hot water or steam from solar thermal concentrator or solar photovoltaics, may be used to heat the working fluid using an inline electric heater.

The shared multiphase riser column 108 may include a double-wall pipe, with a multiphase fluid occupying the inner pipe and negative pressure occupying the annular space. This allows the negative pressure to interact with the first height 124 of the shared multiphase riser column 10, thereby allowing increased gas bubble expansion lower in the column. The inner pipe may be made from a vapor permeable material or a membrane inside a perforated pipe, allowing any entrained gas or vapor to be drawn towards the vacuum.

An effect of the negative pressure created by the vacuum pump 102 is the collection of working fluid vapor. That vapor may naturally or mechanically condense and return to a condensate trap and storage vessel. That vessel 114 may act as a boiler, using electricity from the turbine 116, solar photovoltaics (PVs), or other sources to boil the collected working fluid and inject the working fluid and the thermal energy back into the system 100 to maintain working fluid volumes and to aid fluid flow. As the fluid expands in the boiler and turns to vapor it may overcome the head pressure of the fluid in the loop above and inject the fluid vapor into the working medium.

Negative pressure conditions may cause the gas (entrained in the working fluid in the multiphase fluid) to be detrained from the multiphase liquid more quickly. Less gas may therefore be drawn back down the liquid return column 107. A bias control valve 120 may be placed at or near the top of the liquid return column 107. The bias control valve 120 may operate to release any of the gas still entrained in the working fluid. In some embodiments the bias control valve 120 provides the gas to the gas return column 109. In other embodiments, the bias control valve 120 may vent the gas from the system 100. In still other embodiments, gas may be separated from the working liquid via ultrasonic separation. For example, the bias control valve 120 may provide high- or low-energy ultrasonic waves to the working liquid in the liquid return column 107. The ultrasonic waves may force any gas still entrained in the working liquid to separate from the working liquid. The gas may then be vented from the system 100 or recovered and returned to the gas return column 209.

Figure 2:
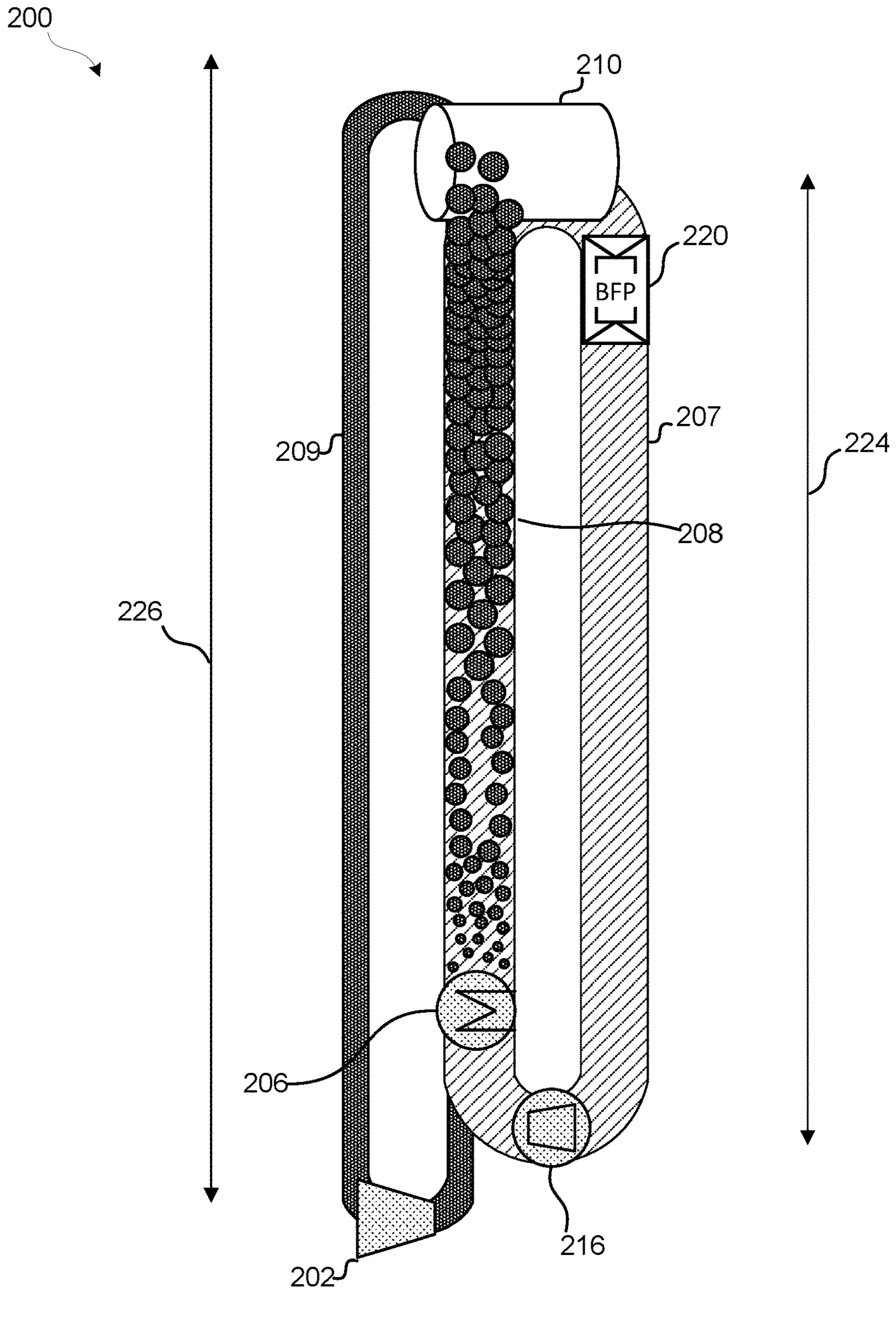
FIG. 2 illustrates a gravity-driven electrical generation system, according to certain embodiments.

FIG. 2 illustrates a gravity-driven electrical generation system 200, according to certain embodiments. The system 200 may include a turbine 216, a compressor 202, a separator 210, and a bias control valve 220. The system 200 may include a plurality of interconnected vertical pipes (sometimes "columns") arranged in one or more loops. A fluid loop may include a liquid return column 207 and a shared multiphase riser column 208. A gas loop may include a gas return column 209 and the shared multiphase riser column 208. The separator 210 may be disposed at a top portion of the shared multiphase riser column 208. The separator 210 may be fluidly connected to the liquid return column 207, the shared multiphase riser column 208, and the gas return column 209.

The liquid return column 207 and the shared multiphase riser column 208 may be fluidly connected at a top portion and a bottom portion of each column. The liquid return column 207 may include a diameter within a range of 0.4 m to 2 m, inclusive. In some embodiments, the diameter may be any diameter capable of being produced. The diameter may be selected based in part on an amount of work required by the system 200. The turbine 216 may be disposed at the bottom portion of the liquid return column 207 and the shared multiphase riser column 208, such that a fluid may enter the turbine 216 via the liquid return column 207 and exit the turbine 216 into the bottom portion of the shared multiphase riser column 208. In some embodiments, the system 200 may include any number of turbines 116. The turbines may be placed anywhere along the liquid return column 207. For example, the system 200 may be partially underground. A turbine may then be placed on the ground at a midpoint of the liquid return column 207. In other embodiments, the system 200 may be supported by a super-structure. The super structure may then include any number of turbines, disposed along the height of the liquid return column 207.

The liquid return column 207 may include a bias control valve 220, similar to the bias control valve 120 in FIG. 1. The liquid return column may contain a working fluid to drive the turbine 216. The working fluid may include water and one or more other substances, such as barite, CaBr2, permanganate (MnO4), Calcium Nitrate (Ca(NO3)2), potassium iodide (KI), and polymethylsiloxane silicone (PDMS), and other suitable substances. The one or more substances may be used to adjust a viscosity, a density, or other characteristics of the working fluid. Additionally or alternatively, the one or more substances may decrease corrosivity of the working fluid. One of ordinary skill in the art would recognize many different appropriate substances to be added, either alone and/or in combination. In some embodiments, the working fluid may include ethylene glycol and/or other liquids.

The gas return column 209 and the shared multiphase riser column 208 may be fluidly connected. The gas return column 209 may contain a gas, such as air, nitrogen, argon, hydrogen, or other such gas. The gas loop may include the compressor 202, disposed at a bottom portion of the gas return column 209. The compressor 202 may compress the gas from the gas return column 209 to generate pressurized gas. The gas return column 209 may the provide the pressurized gas to the shared multiphase riser column 208.

The compressor 202 may include one or more compression pumps, intercoolers, and/or absorption chillers. The compressor 202 may be configured to deliver the compressed gas to the shared multiphase riser column 208 at an optimal pressure range (e.g., 300 psi to 700 psi, inclusive) and temperature range (e.g., 100° C. to 300° C.). However, as the gas is compressed, the temperature of the gas may rise. The one or more compression pumps may have some maximum intake temperature, above which would damage the compression pump and/or cause a failure. To avoid this, the one or more compression pumps may be "daisy-chained" such that excess heat is removed between compression cycles. Thus, the final compression stage may result in pressurized gas at a higher pressure than may be achievable using compression pumps alone.

For example, the compressor 202 may include a first intercooler that intakes gas from the gas return column 209 and removes excess heat from the gas. The first intercooler may then direct the gas to a first compression pump. The first compression pump may then provide the gas to a second intercooler that removes the excess heat. This compression/cooling cycle may continue for any number of iterations. At each cooling stage, the heat removed by the intercoolers may be directed towards one or more heat pumps. A portion of the heat may then be applied to the gas before the final compression pump, such that the gas is at or near the maximum intake pressure of the final compression pump. In some embodiments, the portion of the heat may be applied to the pressurized gas after the final compressor pump and before the pressurized gas is provided to the shared multiphase riser column 208. Therefore, the pressurized gas exiting the final compression pump may have a maximum temperature.

In some embodiments, the compressor 202 may include a multi-pass compressor. The multi-pass compressor may include one or more gas compressors and cooling systems. The cooling systems may include one or more vapor compression refrigerant compressors, one or more condensers, and a subcooling coil. The cooling systems may be disposed between the one or more gas compressors, cooling compressed gas before the compressed gas enters the next one gas compressor. The refrigerant may absorb heat from the compressed gas between each stage, evaporating at or prior to the last compression stage. The refrigerant may then condense via an ambient air temperature of the air surrounding the cooling systems. The refrigerant may then be compressed by the one or more refrigerant condensers, such that the refrigerant may be reused. In some embodiments, the multi-pass compressor may include an energy recovery chiller.

Because the system 200 is a closed-loop gas system, operating pressures of the system 200 may be increased or decreased (as in FIG. 1). In an open-loop gas system, the gas may be injected into the system then released after rising in a riser column. Because the gas is released immediately after use, air may be the only viable gas. In order to generate enough force to lift the multiphase fluid to 100 m, a gas may need to be delivered to the system at or above 156 psi higher than an ambient pressure to overcome the hydrostatic pressure created by the multiphase fluid. Ambient pressure is around 15 psi. Therefore, the minimum compression ratio needed in an open-loop gas system is approximately 11 to 1. In a closed-loop gas system, the ambient pressure is the pressure within the system itself. Thus, the compression ratio may be reduced. For example, if the pressure at the top of the closed-loop gas system is 800 psi and the injection pressure in the closed-loop gas system is 950 psi, there is a similar difference in pressure, but the compression ratio is only 1.18 to 1. In other words, the compressor 202 may require less work in a closed-loop gas system to deliver better performance.

The compressor 202 may include a gas injector, configured to deliver the pressurized gas to the shared multiphase riser column 208. Once entrained in the working fluid, the bubbles of pressurized gas may have a large velocity than those of gases at lower pressures. Because the velocity of the bubbles within the multiphase fluid is increased, the drag force may be increased. Furthermore, because the pressurized gas may be provided to the shared multiphase riser column 208 at an optimal temperature, the volume of the bubbles may be larger than with lower temperature gasses. Thus, the multiphase fluid in this case may include less working fluid and more pressurized gas (by volume). Thus, the density and mass differences between the liquid return column 207 and the shared multiphase riser column 208 may be greater, and the overall flow of the system increased.

The liquid return column 207 and the shared multiphase riser column 208 may include a first height 224. The first height may be within a range of 30 m to 200 m, inclusive. The first height 224 and the diameter of the liquid return column 207 may be configured to enable a specific amount of work to be applied to the turbine 216. The gas return column 209 may include a second height 226, greater than the first height 224. The second height may be determined based at least in part on the working liquid, the gas, and an associated vapor pressurization of both. For example, if the working fluid is water, the difference between the second height 226 and the first height 224 may be at least approximately 10 m for operation at standard temperatures, which may be the theoretical equivalent of creating 10 m of head pressure for the turbine 216. In other embodiments, with working fluids other than water, the difference between the first height 224 and the second height 226 may be smaller (e.g., 1 m).

In some embodiments a thermal energy injection site 206 may deliver thermal energy to the shared multiphase riser column to accelerate expansion of the multiphase fluid. The thermal energy injection site 206 may be include a heat exchanger or other suitable method. The thermal energy injection site 206 may be positioned on the shared multiphase riser column 208. The thermal energy for the thermal energy injection site 206 may originate at least in part from the heat generated by the compressor 202. The thermal energy injection site 206 may raise the temperature of the multiphase liquid may be increased. Thus, the density of the multiphase fluid may be further reduced, creating more efficient flow of the multiphase fluid and/or working fluid through the system 200. Furthermore, because the density of the multiphase fluid is decreased, less work may be required of the compressors. Therefore, less electrical energy is used by the compressor 202 and the system 200 may become even more efficient.

Furthermore, because the gas loop is a closed loop, higher or lower internal pressures may be achieved. As the pressure increases, the less work by the compressor is needed to move a mass of the multiphase fluid through the shared multiphase riser column 208. The pressurized gas may therefore be superheated and reduce the work required by the compressor (e.g., a 50% reduction) as compared to open-gas loop systems.

Figure 3:
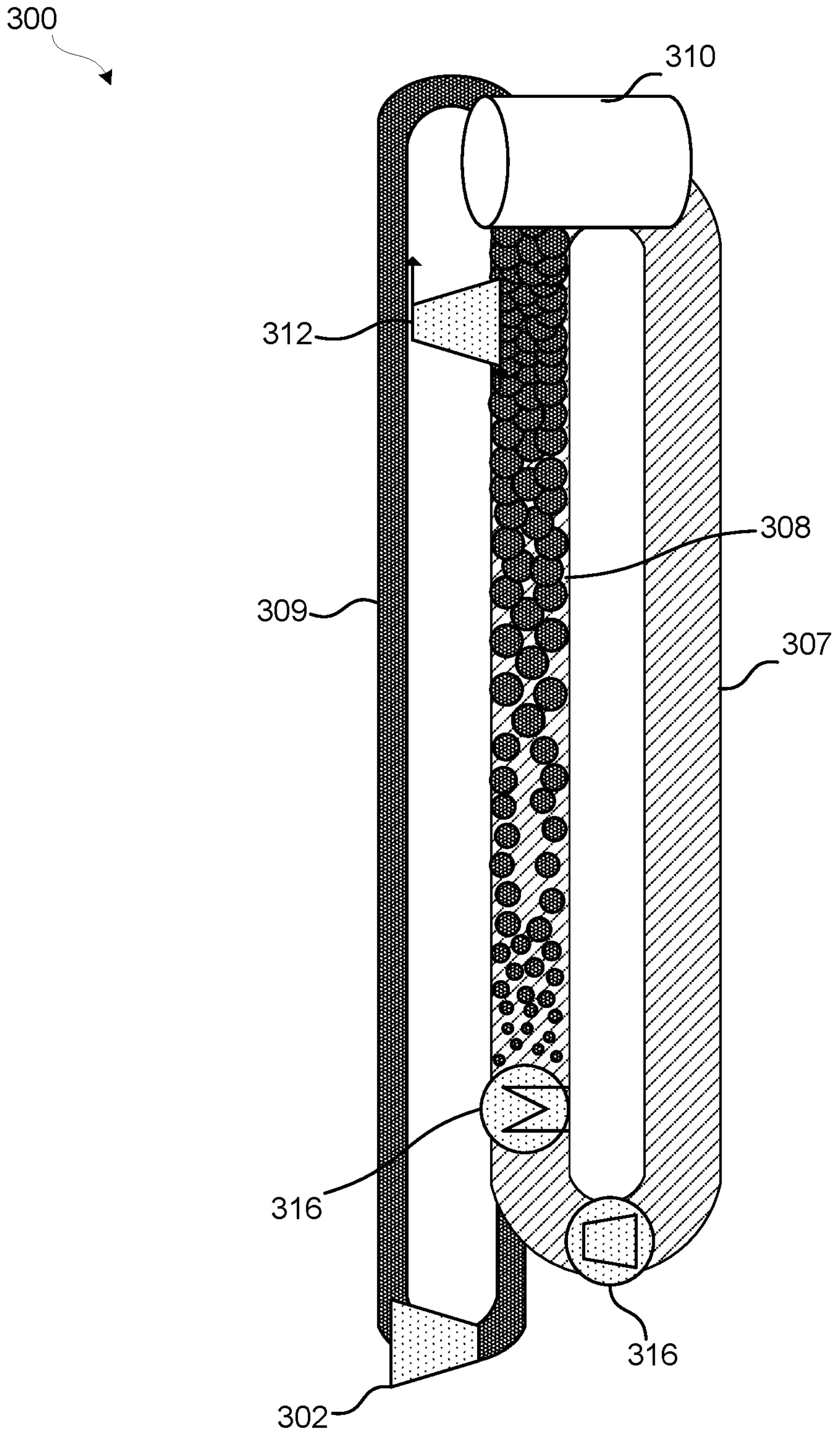
FIG. 3 illustrates a illustrates a gravity-driven electrical generation system, with a compressor and a vacuum pump, according to certain embodiments.

FIG. 3 illustrates a illustrates a gravity-driven electrical generation system 300, with a compressor 303 and a vacuum pump 313, according to certain embodiments. The system 300 may be similar to the system 300, and include corresponding and/or similar features and functionalities. As such, the system 300 may include a turbine 316, a compressor 302, a separator 310, and a bias control valve 320. The system 300 may include a plurality of interconnected vertical pipes (sometimes "columns") arranged in one or more loops. A fluid loop may include a liquid return column 307 and a shared multiphase riser column 308. A gas loop may include a gas return column 309 and the shared multiphase riser column 308. The separator 310 may be disposed at a top portion of the shared multiphase riser column 308. The separator 310 may be fluidly connected to the liquid return column 307, the shared multiphase riser column 308, and the gas return column 309.

The system 300 may also include the vacuum 312. Whereas the vacuum pump 102 in FIG. 1 is shown as creating a negative pressure within the gas return column 109, the vacuum 312 may be disposed at or near the top of the shared multiphase fluid column 308. The vacuum 312 may apply a negative pressure to the shared multiphase riser column 308, decreasing the vapor pressure of the multiphase fluid and/or the working fluid. By applying a negative pressure to the multiphase fluid, the expansion of the pressurized gas may be further increased.

Figure 4:
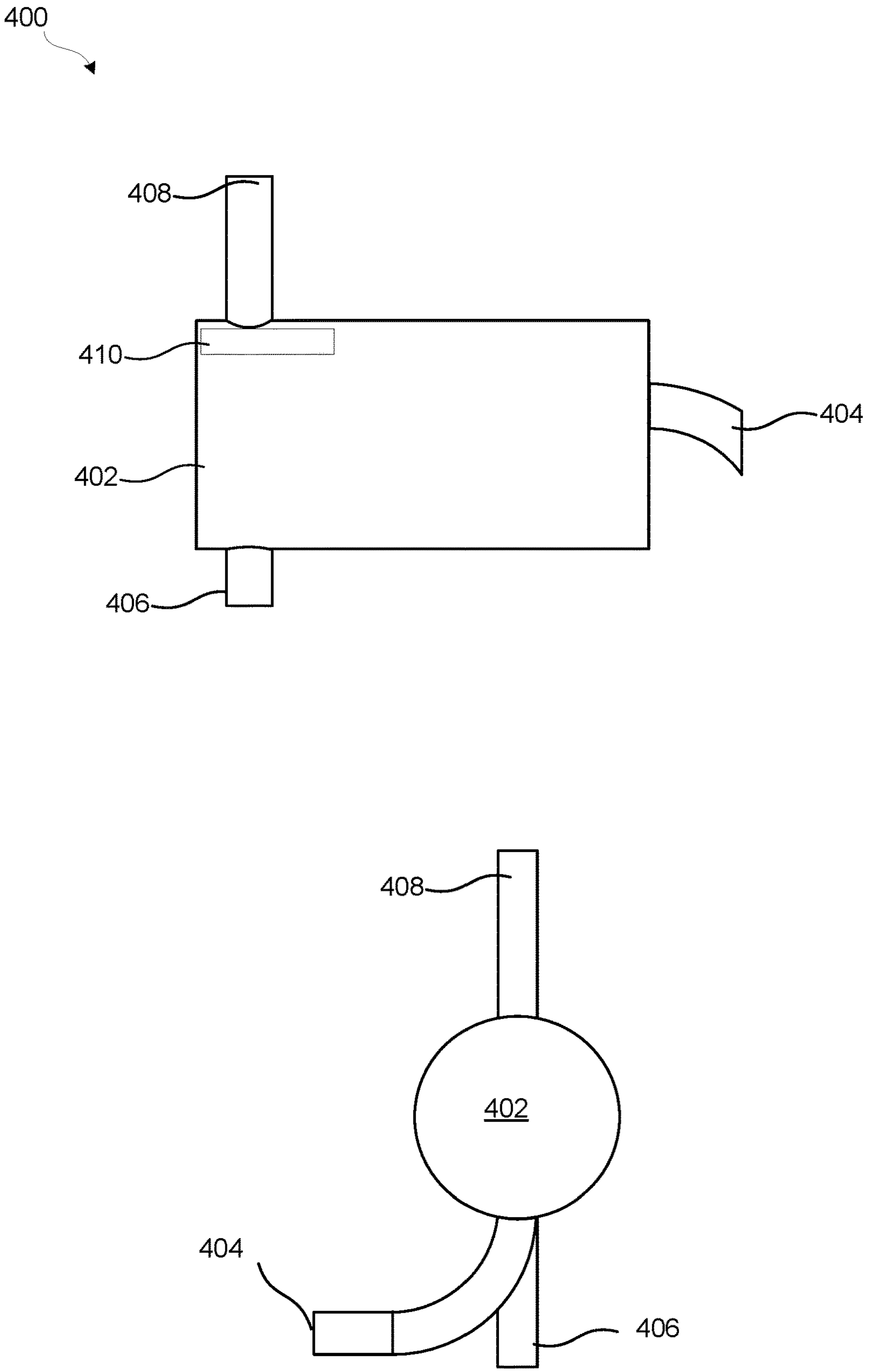
FIG. 4 illustrates a separator, according to certain embodiments.

FIG. 4 illustrates a separator 400, according to certain embodiments. The separator 400 may be similar to the separator 110 described in FIG. 1. The separator 400 may include a separation tank 402, a multiphase inlet 404, a working fluid outlet 406, a gas outlet 408, and mist separator. The separation 400 may be a component of a gravity-driven electrical generation system, such as the system 200 in FIG. 2.

The multiphase inlet 404 may be fluidly connected to the separation tank 402 and a multiphase riser column, such as the shared multiphase riser column 308 in FIG. 3. The gas outlet 408 may be fluidly connected to a gas return column, such as the gas return column 209 in FIG. 2. The working fluid outlet 406 may be fluidly connected to a liquid return column such as the liquid return column 207 in FIG. 2.

The multiphase inlet 404 may allow a multiphase fluid to enter the separation tank 402. In the separation tank 402, the multiphase fluid may be separated into a gas component and a working fluid component. The gas component may include nitrogen, hydrogen, argon, and/or other suitable gases. The working fluid may include water and one or more other substances, such as barite, CaBr2, permanganate (MnO4), Calcium Nitrate (Ca(NO3)2), potassium iodide (KI), and polymethylsiloxane silicone (PDMS), and other suitable substances. The multiphase fluid may separate through evaporative forces. As the gas component separates from the working fluid component, the gas may rise to the gas outlet 408. The gas outlet 408 may then allow the gas component to flow from the separator tank 402 to the gas return column. In some embodiments, the separator tank 402 may include a mist filter 410 at or near the gas outlet 408. The mist filter 410 may remove particles of the working fluid component from the gas component of the multiphase fluid. The working fluid component may then flow through the work fluid outlet into the liquid return column.

Figure 5:
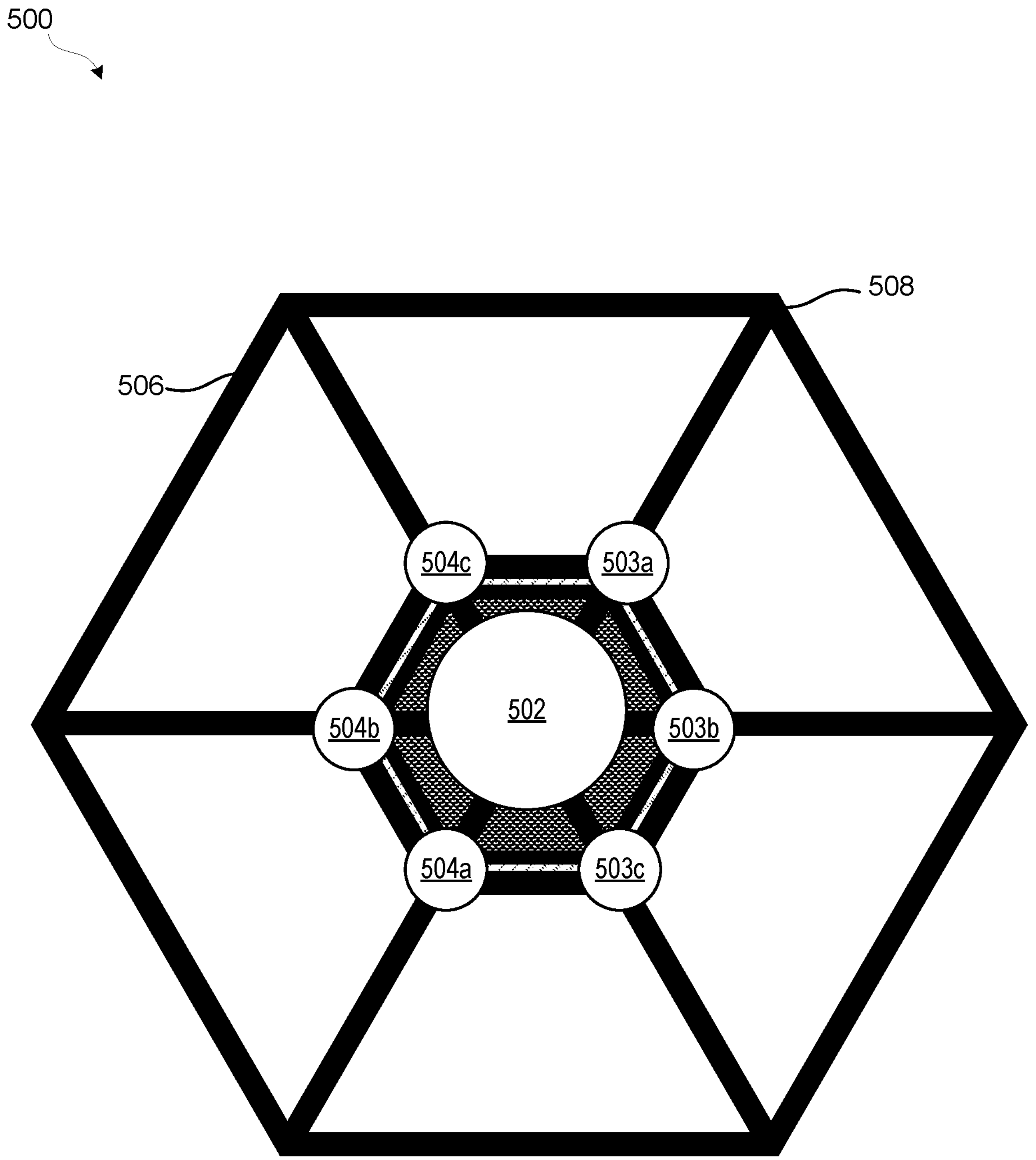
FIG. 5 illustrates a top-down view of a gravity-driven electrical generation tower, according to certain embodiments.

FIG. 5 illustrates a top-down view of a gravity-driven electrical generation tower 500, according to certain embodiments. The tower 500 may include a shared multiphase riser column 502, liquid return columns 503*a-c*, gas return columns 504*a-c*, a base element 506, and radial structural elements 508. The shared multiphase riser column 502 may be similar to the shared multiphase riser column 308 in FIG. 3. The liquid return columns 503*a-c* may be similar to the liquid return column 307 and the gas return columns 504*a-c* may be similar to the gas return columns 309. Each of the liquid return columns 503*a-c* may be fluidly connected to the shared multiphase riser column 502, forming for a closed-loop liquid structure. Similarly, each of the gas return columns 504*a-c* may be fluidly connected to the shared multiphase riser column 502, forming a closed-loop gas structure. In relation to FIG. 3, the tower 500 may be an electrical generation tower including three separate systems 300 arranged radially. Although only six closed-loop structures are shown (three gas, three liquid), there may be any number of closed-loop structures (e.g., 1, 4, 8, 10, etc.). The total height of the tower 500 may be within a range of 30 m to 150 m, inclusive. For example, the shared multiphase riser column 502 and the liquid return columns 503*a-c* may include a first height (e.g., 100 m). The gas return columns 504*a-c* may include a second height, greater than the first height (e.g., 10 m). To support the tower 500, a base element 506 may be arranged radially about a center of the tower 500. The tower 500 may also include radial structural elements 508, that support the tower 500.

The multiphase riser column 502, the liquid return columns 503*a-c*, and the gas return columns 504*a-c* may all include similar sizes and dimensions and/or varying sizes and dimensions. Furthermore, although only one multiphase riser column is shown with three liquid return columns 503*a-c*, other configurations are possible. For example, a single liquid return column may be fluidly connected to a plurality of multiphase riser columns, such that the liquid return column contains a larger volume than that of a multiphase riser column. Gas return columns may be configured in a similar manner.

In some embodiments, sections of structural components such as the base element 506 and the radial structural elements 508 may be fitted with the necessary pipes and built in an offsite for ease of fabrication, transportation, and installation. A climbing unit may attach to the ground-level structural, and use a jib to lift sections into place, climb the, and repeat the stacking process. To reduce tower weight and cost, piping of suitable size and strength to act at the structural elements of the tower may be used.

In some embodiments, the tower 500 may be located above ground in a standalone tower or integrated into a building. In other embodiments, the tower 500 may be located below ground. For example, the tower 500 may be in a mine shafts, a newly drilled hole, or other such recesses. In another example, an abandoned oil/gas well may include existing fluids in the well (e.g., the fluids used in fracking). The tower 500 may be constructed in the abandoned well. The working fluid contained in the liquid return columns may therefore include at least some of the existing fluids. Accessible geothermal energy may be leveraged as a thermal energy source to increase the net output of the system, either by increasing the work fluid temperature, or in conjunction with an ORC or similar technology. The tower may also be built through the use of additive manufacturing techniques.

In some embodiments, the tower 500 may be manufactured in whole or in part via 3-D printing techniques. For example, some portions of the tower 500 may be manufactured by a metal-printing 3-D printing apparatus. The components manufactured by the 3-D printing apparatus may therefore be of any dimensions, including those not commercially available.

In some embodiments, the tower 500 may be self-supporting, with at least some of the closed-loop gas structures and closed-loop liquid structures supporting other structures. In other embodiments, the tower 500 may be supported by a super structure. The super structure may include a framework surrounding the tower 500 any supporting at least some of the closed-loop gas structures and closed-loop liquid structures. The super structure may also support one or more turbines, disposed along the height of each liquid return column 507*a-c*.

The working fluid may use a non-foaming surfactant to aid gas entrainment and release. Different combinations of fluid and gas densities may be used to optimize performance. The inlet valve 104 may be designed in a manner that increases the negative pressure in the common riser, thereby increasing the rate of working fluid flow.

In any embodiments, any or all of the following features may be implemented in any combination and without limitation. The working fluid may contain magnetic elements, thereby creating an infinite magnetic medium. When flowing through a coil mounted on one of the fluid pipes, the system may thus generate electricity, as a magnet moving through a coil may induce an electric current in the coil. The structure of the tower may include brackets and mounting anchors to support a renewable energy system, and those brackets may rotate around the vertical axis of the tower to track sun orientation or prevailing wind. The structure of the tower may include brackets and mounting anchors to support cell phone antenna and other systems. ORC engines or thermocouples may be integrated into the system to convert thermal energy into electricity and increase the net energy produced. The tower may be constructed in a modular fashion with all or some piping installed for ease of fabrication, transportation, and/or assembly on site. The structure may erect itself with a climber/jib/machine unit. These practices significantly improve build time and lower costs.

Figure 6:
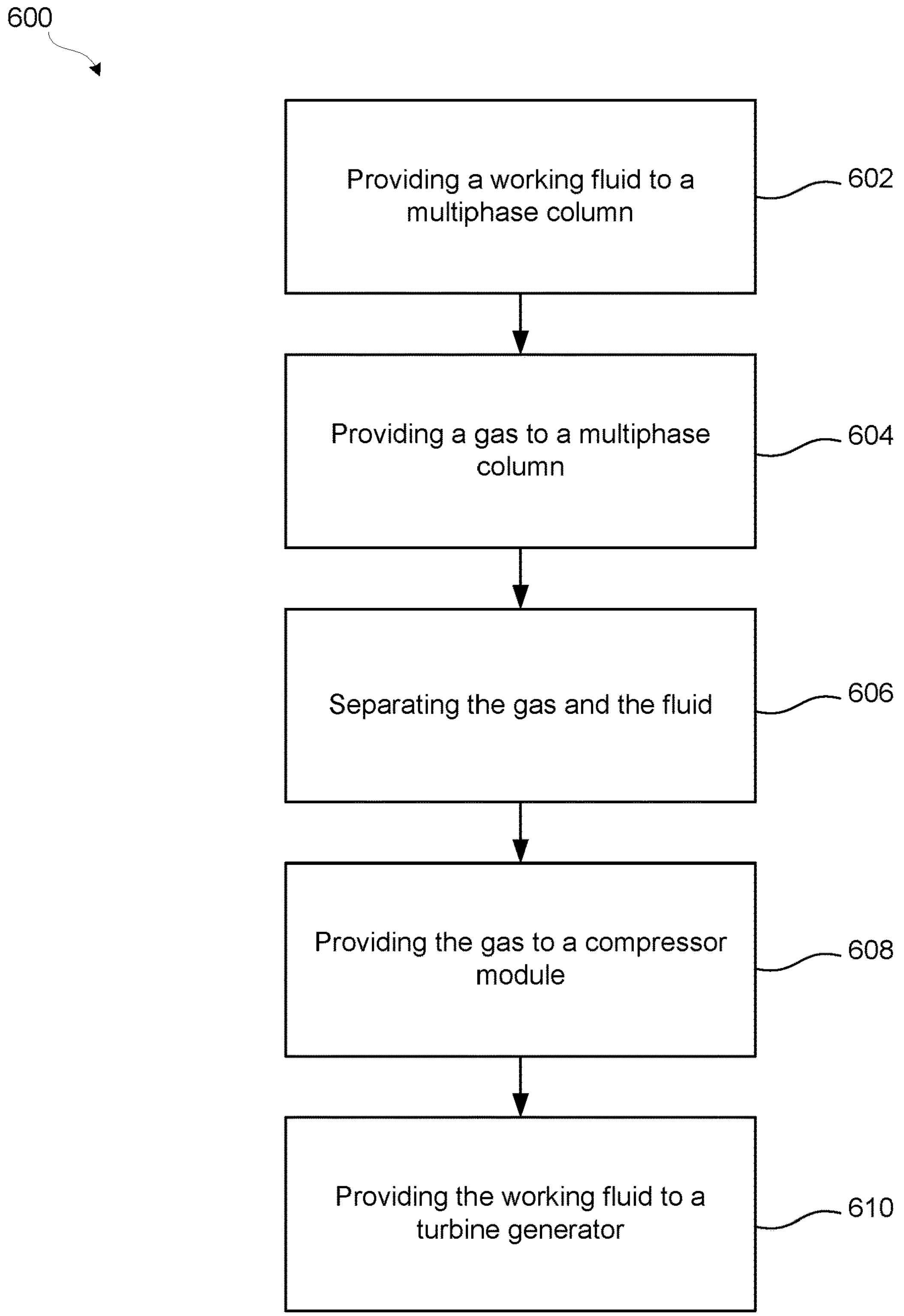
FIG. 6 illustrates a flowchart of a method for generating electricity, according to certain embodiments.

FIG. 6 illustrates a flowchart of a method 600 for generating electricity, according to certain embodiments. The method 600 may be performed by any or all of the systems and structures disclosed herein. For example, the method 600 may be performed by the tower 500 in FIG. 5 including systems 100, 200, and/or 300 in FIGS. 1, 2, and 3, respectively. It will be appreciated that while performing the method 600, some steps may be performed in a different order than is shown, or skipped altogether.

At step 602, the method 600 may include providing a working fluid to a multiphase riser column. The multiphase riser column may be similar to the shared multiphase riser column 208 in FIG. 2. The multiphase riser column may contain a multiphase fluid. The multiphase fluid may be forced upwards through the multiphase riser column. In some embodiments, the multiphase riser column may include a double-wall pipe, with a multiphase fluid occupying an inner pipe and negative pressure occupying the interstitial space. The inner pipe may be made from a vapor permeable material or a membrane inside a perforated pipe, allowing any entrained gas or vapor to be drawn towards the vacuum. The working fluid may include water and one or more other substances including barite, CaBr2, permanganate (MnO4), Calcium Nitrate (Ca(NO3)2), potassium iodide (KI), and polymethylsiloxane silicone (PDMS), and other suitable substances.

At step 604, the method 600 may include providing, by a compressor, a gas to the multiphase riser column. The gas may combine with the working fluid in the multiphase riser column to form the multiphase fluid. The gas may include nitrogen, argon, hydrogen, or any other suitable gas. The multiphase fluid may include bubbles of the gas within the working fluid. The Multiphase fluid may be characterized as having less density and/or mass than the working fluid.

The compressor may be similar to the compressor 202 in FIG. 2. As such, the compressor may include any number of compression pumps and/or intercoolers working in conjunction. Heat from the compression may be supplied to the gas at the final stage of the compression. In some embodiments, at least a portion of the heat may be provided to the multiphase riser column, raising the temperature of the multiphase fluid and/or the working fluid.

At step 606, the method 600 may include separating, in a separator, the gas and the working fluid from the multiphase fluid. The separator may be similar to the separator 400 in FIG. 4. As such, the separator may be fluidly connected to the multiphase riser column. The multiphase fluid may be separated through diffusive or evaporative processes.

At step 608, the method 600 may include providing the gas from the separator to the compressor via a gas return column. The gas return column may be similar to the gas return column 109 in FIG. 1 and/or the gas return column 209 in FIG. 2. Thus, the gas return column may include a vacuum pump, and the gas returned to the compressor via negative pressure applied to the gas return column. The gas return column, multiphase riser column, and/or the separator may for a closed-loop structure, such that little to no gas escapes or enters the system. By implementing the method 600 in a closed-loop structure, energy requirement needed to generate electricity may be reduced.

At step 610, the method 600 may include providing the working fluid from the separator to a liquid return column, similar to the liquid return column 207 in FIG. 2. The working fluid may cause a turbine (e.g., the turbine 216 in FIG. 2) to produce electricity. The working fluid may accelerate down the liquid return column to the turbine generator due to gravity.

Figure 7:
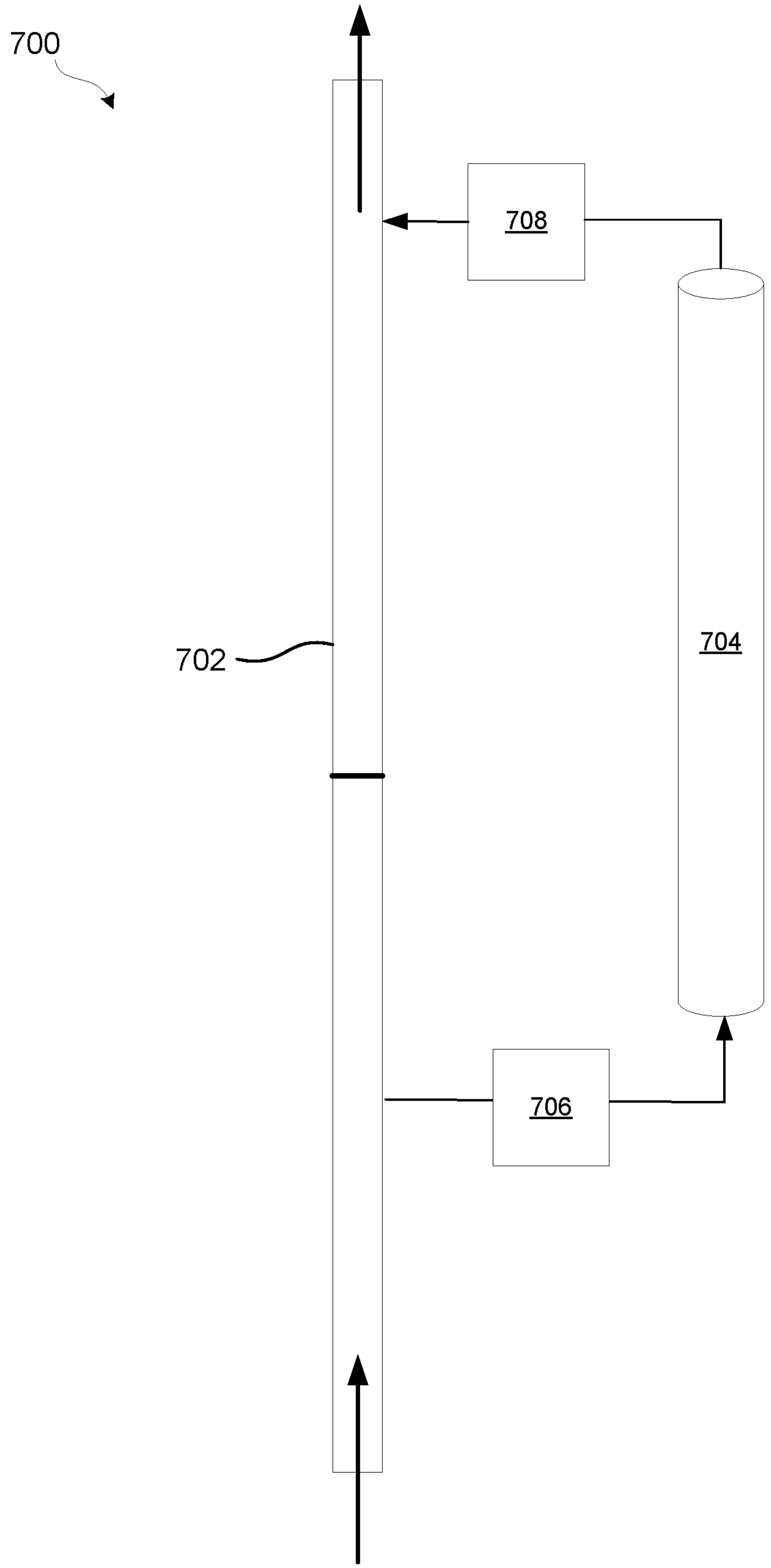
FIG. 7 illustrates a loop of a pressure-variant multiloop system, according to certain embodiments.

FIG. 7 illustrates a loop 700 of a pressure-variant multi-loop system, according to certain embodiments. The loop 700 may include a high pressure gas column (HP column) 702, a low pressure column (LP column) 704, a pressure reducer valve 706, and a vacuum ejector 708. The HP column 702 may be similar to the gas return column 209 in FIG. 2 and include a gas (e.g., nitrogen) at a first pressure (e.g., within a range of 200-100 psi, inclusive). The LP column 704 may be similar to the shared multiphase riser column 208 in FIG. 2. The LP column 704 may be a component of a closed-loop liquid structure and include a working liquid. The LP column may be held at a lower pressure than the HP column 702 (e.g., 14 psi).

The HP column 702 may provide the gas to the LP column 704 via the pressure reducer valve 706. The pressure reducer valve 706 may reduce the pressure of the gas provided from the HP column 702. For example, the HP column 702 may provide the gas at 750 psi. The pressure reducer valve 706 may reduce the pressure of the gas to 156 psi, then provide the gas to the LP column 704 at 156 psi. The gas may then combine with the working fluid within the LP column 704 to create a multiphase liquid. The pressure differential between the gas and the hydrostatic pressure of the working fluid may cause the multiphase liquid to flow through the LP column 704.

The gas may exit the LP column 704 through a separator such as the separator 400 in FIG. 5. The gas may then be directed to the vacuum ejector 708. The vacuum ejector 708 may generate levels of vacuum via the Venturi effect such that the gas may rejoin the HP column 702. The gas may then flow to a compressor, such as the compressor 202 in FIG. 2.

Although only one LP column 704 is shown, there may be any number of LP columns. The HP column 702 may provide the gas at a high pressure to each of the LP columns. The HP column can therefore be considered a high-pressure circuit, providing gas to any number of LP columns. In some embodiments, multiple high-pressure circuits may provide gas to respective groups of LP columns. For example, a tower such as the tower 500 in FIG. 5 may include 15 LP columns (as shared multiphase riser columns). Three high-pressure circuits may provide gas to respective groups of five LP columns. One of ordinary skill in the art would recognize many other configurations and possibilities.

While the invention has been described in detail, modifications within the spirit and scope of the invention will be readily apparent to those of skill in the art. It should be understood that aspects of this invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only and is not intended to limit the invention. All US patents and publications cited herein are incorporated by reference in their entirety.

What is claimed is:

1. A closed-loop electrical generation system, comprising:

a closed-loop gas structure that provides nitrogen and comprising a gas return column and a shared multiphase riser column;

a closed-loop liquid structure that provides a working fluid and comprising a liquid return column and the shared multiphase riser column;

a separator disposed at a top of the shared multiphase riser column comprising:

a multiphase inlet pipe fluidly connected to the shared multiphase riser column;

a gas outlet pipe fluidly connected to the gas return column;

a working fluid outlet pipe fluidly connected to the liquid return column; and a separation tank comprising a mist filter, wherein the mist filter is configured such that the gas and the working fluid are separated and preserved from the multiphase fluid;

a compressor disposed at a bottom of the closed-loop gas structure and configured to pressurize the nitrogen and provide the pressurized nitrogen to the shared multiphase riser column to entrain the pressurized nitrogen in the working fluid;

a vacuum pump fluidly connected to the multiphase fluid riser column; and a turbine generator disposed at a bottom of the closed-loop liquid structure such that the working fluid causes one or more blades of the turbine generator to turn and produce electricity.

2. The closed-loop electrical generation system of claim 1, wherein the compressor includes at least one of a heat exchanger and an intercooler.

3. The closed-loop electrical generation system of claim 1, wherein the working fluid comprises water and one or more of tungsten, barite, CaBr2, MnO4, Ca(NO3)2, KI, and Polymethylsiloxane silicone.

4. The closed-loop electrical generation system of claim 1, wherein the working fluid comprises fluorocarbons.

5. The closed-loop electrical generation system of claim 1, further comprising:

a plurality of closed-loop gas structures; and a plurality of closed-loop liquid structures, wherein the plurality of closed-loop gas structures and the plurality of closed-loop liquid structures share one or more shared multiphase riser columns.

6. The closed-loop electrical generation system of claim 1, wherein the pressurized nitrogen is provided to the shared multiphase riser column within a range of 100 to 1000 psi, inclusive.

7. The closed-loop electrical generation system of claim 1, wherein an operating pressure of the closed-loop electrical generation system is above atmospheric pressure.

8. A closed-loop electrical generator, comprising:

a multiphase riser column;

a liquid return column;

a turbine generator disposed between the multiphase riser column and the liquid return column, such that a working fluid flows from the liquid return column to the turbine generator and then to the multiphase riser column;

a gas return column;

a compressor fluidly connected to the gas return column and the multiphase riser column, such that a gas from the gas return column is provided to the multiphase riser column and combined with the working fluid to produce a multiphase fluid; and a separator fluidly connected to the multiphase riser column, the liquid return column, and the gas return column and comprising a mist filter and a separation tank, wherein the mist filter is configured such that the gas and the working fluid are separated and preserved from the multiphase fluid.

9. The closed-loop electrical generator of claim 8, wherein the compressor includes a first compressor, an intercooler, a second compressor, an absorption chiller, and a heat exchanger.

10. The closed-loop electrical generator of claim 8, wherein heat produced by the compressor is provided to the multiphase fluid within the multiphase riser column.

11. The closed-loop electrical generator of claim 8, wherein the gas comprises at least one of nitrogen, hydrogen, and argon.

12. The closed-loop electrical generator of claim 8, wherein the working fluid comprises water and at least one of $Mn2O2$, $CaBr2$, Bentonite, and Polyacrylamide.

13. The closed-loop electrical generator of claim 8, wherein the multiphase riser column and the liquid return column form a closed-loop containing the working fluid.

14. The closed-loop electrical generator of claim 8, wherein the multiphase riser column and the gas return column form a closed loop containing the gas.

15. A method of producing electricity, comprising:

providing a working fluid to a multiphase riser column;

providing, by a compressor, a gas to the multiphase riser column, such that the working fluid and the gas combine to form a multiphase fluid;

separating, in a separator, the gas and the working fluid from the multiphase fluid such that the gas and working fluid are preserved, the separator comprising a mist filter and a separation tank, wherein the mist filter separates and preserves the multiphase fluid;

providing the gas from the separator to the compressor via a gas return column; and providing the working fluid from the separator to a turbine generator via a liquid return column such that the working fluid causes the turbine generator to produce electricity.

16. The method of claim 15, wherein the multiphase fluid flows upwards in the multiphase riser column to the separator.

17. The method of claim 15, wherein heat is provided to the multiphase riser column to increase a temperature of the multiphase fluid within the multiphase riser.

18. The method of claim 15, wherein the working fluid accelerates from the separator to the turbine generator due at least in part to gravity.

19. The method of claim 15, wherein the gas comprises nitrogen.

* * * * *